INVENTOR.

JOACHIM v. ALBEDYLL
FRIDOLIN HENNIG

BY Michael S. Striker 3,456,567
PHOTOGRAPHIC CAMERA WITH BUILT-IN FLASH UNIT
Joachim von Albedyll and Fridolin Hennig, Munich, Germany, assignors to Agfa-Gevaert Aktiengesellschaft, Leverkusen, Germany
Filed July 19, 1966, Ser. No. 566,420
Claims priority, application Germany, July 23, 1965, A 49,817
Int. Cl. G03b 9/70
U.S. Cl. 95—11.5        13 Claims

ABSTRACT OF THE DISCLOSURE

A photographic camera wherein a multiple flash bulb holder is rotatable by the film transporting mechanism or by the shutter cocking mechanism when a ring-shaped selector is held in one of several first angular positions each of which corresponds to a different aperture size. The selector is further movable to several second angular positions in which the flash circuit is open and the multiple flash bulb holder is held against rotation so that the camera is ready for operation in daylight. In one such second position of the selector, the camera is set for automatic selection of exposure values as a function of scene brightness.

---

Figure 1:
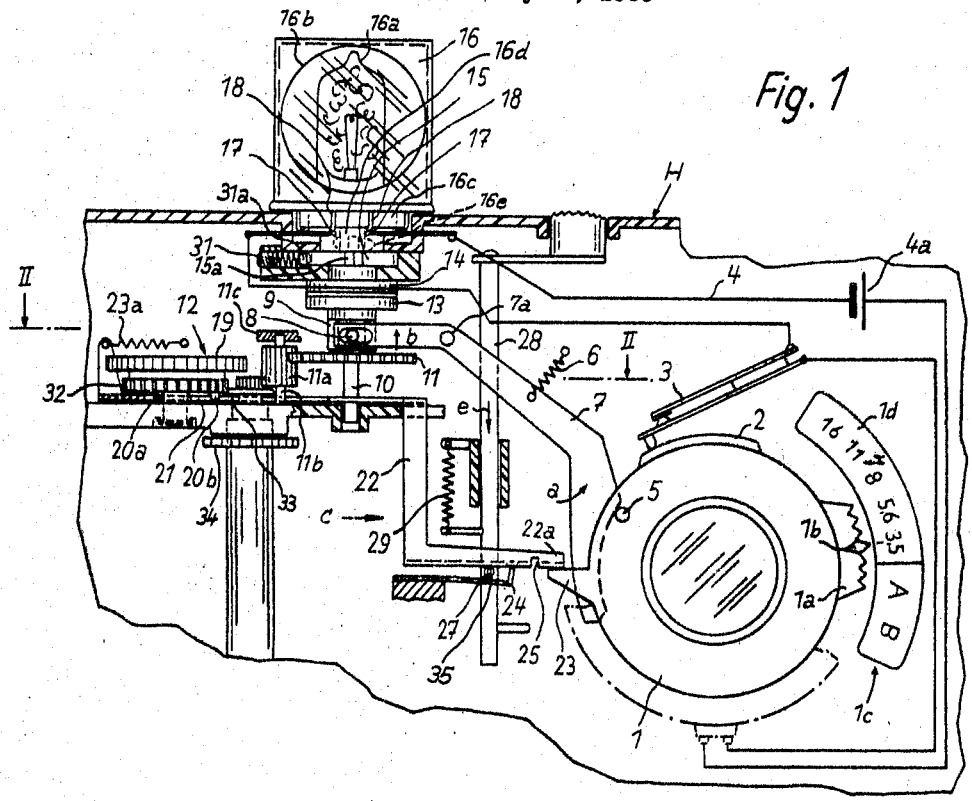

The present invention relates to photographic cameras in general, and more particularly to improvements in photographic cameras of the type having a built-in flash unit, for example, a flash unit utilizing multiple flash bulb holders known as "Flashcubes." A "Flashcube" comprises four reflectors, each located behind a flash bulb, and a plug which can be introduced into a suitable recess provided in a socket which is rotatably supported by the housing of the camera. Still more particularly, the invention relates to improvements in cameras of the type wherein the multiple flash bulb holder can be rotated by an indexing mechanism to place successive flash bulbs into an optimum position for operation with flash.

A serious drawback of many presently known cameras with built-in flash units utilizing multiple flash bulb holders is that the holder is rotated subsequent to completion of each exposure, regardless of whether the exposure is made in daylight or with flash. In many instances, the indexing mechanism for the multiple flash bulb holder is operated by the film transporting mechanism and the driving connection between such mechanisms is permanent so that the holder must change its angular position whenever the operator of the camera manipulates the film transporting mechanism. Also, such conventional cameras cannot prevent the discharge of a flash during an exposure when the multiple flash bulb holder contains at least one unexpended flash bulb. This is undesirable because the operator might wish to make one or more exposures in daylight subsequent to making a single exposure with flash. Furthermore, the wear on the indexing mechanism and on the film transporting mechanism is very high because the film transporting mechanism must operate the indexing mechanism whenever the film is to be transported by the length of a frame.

Accordingly, it is an important object of the present invention to provide a photographic camera with a built-in flash unit which is constructed and assembled in such a way that the multiple flash bulb holder of the flash unit is caused to change its angular position only at such times when the operator has completed an exposure with flash so that a fresh flash bulb is invariably ready to illuminate the subject during the next exposure with flash.

Another object of the invention is to provide a camera of the just outlined characteristics wherein the operator can decide to make one or more successive exposures with flash and wherein the flash unit is not operated at all when the exposure is made in daylight.

A further object of the invention is to provide a camera wherein the flash circuit cannot be completed when the operator sets the camera for operation in daylight.

An additional object of the invention is to provide a novel device which can prevent operation of the indexing mechanism for the multiple flash bulb holder by disconnecting the indexing mechanism from the film transporting mechanism or from another suitable drive therefor when the camera is to be used in daylight.

A concomitant object of the invention is to provide a camera wherein the exposures with flash can be made in different positions of the diaphragm so that the user of the camera can select the exact size of the aperture.

Still another object of the instant invention is to provide a camera which can be readily manipulated by amateur photographers and wherein the multiple flash bulb holder of the flash unit cannot change its position when the camera is used to make exposures in daylight so that a fresh flash bulb which faces the subject during an exposure in daylight remains in such position and is ready to be discharged during the next-following exposure with flash.

Briefly stated, one feature of the present invention resides in the provision of a photographic camera, particularly a still camera, which comprises a support (for example, the housing of a still camera), a flash unit comprising a "Flashcube" or an analogous multiple flash bulb holder having a plurality of flash bulbs, and a flash circuit including control switch means which must be closed in order that the camera may operate with flash, the flash bulbs being connected in the flash circuit one after the other in response to successive angular displacements of the holder through 90 degrees or other angles of predetermined magnitude, indexing means for moving the holder through such angles, drive means for operating the indexing means and preferably including means for performing at least one function which is incidental to normal manipulation of the camera between successive exposures (for example, the drive means can constitute or comprise a film transporting and/or shutter cocking mechanism), and manually operated selector means provided on the support and movable between at least one first position in which the control switch means is invariably open to prevent completion of the flash circuit so that the camera can take pictures in daylight or in artificial light other than that produced by a flash bulb of the holder, and at least one second position in which the control switch means is invariably closed so that the camera is set for operation with flash.

Figure 2:
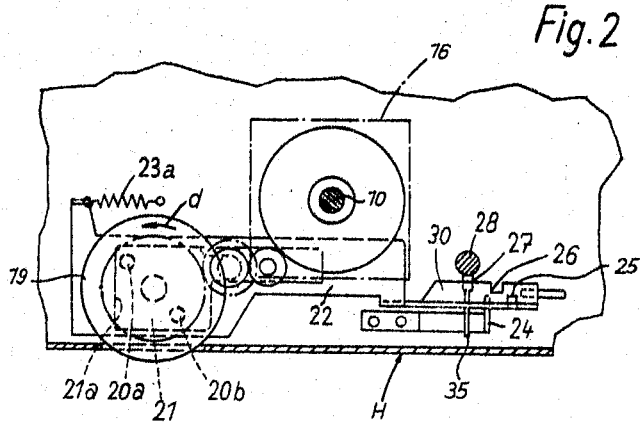

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of a specific embodiment with reference to the accompanying drawings, in which:

FIG. 1 is a somewhat schematic fragmentary vertical section through the housing of a still camera which embodies the present invention; and FIG. 2 is a horizontal section substantially as seen in the direction of arrows from the line II—II of FIG. 1.

Referring to the drawings in detail, FIG. 1 shows a support H which is constituted by the housing of a still camera. The latter comprises a manually operable conditioning element or selector 1 here shown as a ring having a serrated projection 1a adapted to be engaged by a finger in order to move the selector to a plurality of angular positions. When the index 1b of the selector 1 is moved into registry with a graduation A on a fixed scale 1c of the housing H, the camera is set for automatic operation so that the exact size of the diaphragm aperture and/or the shutter speed is selected as a function of the intensity of scene light, i.e., as a function of the intensity of light reflected from a viewed subject. By placing the index 1b of the selector 1 into registry with a graduation B, the camera is set to make an exposure during which the shutter remains open until the release trigger is actually disengaged by the operator's finger. When the camera is to be set for operation with flash, the index 1b is moved into registry with one of several graduations on the sector 1d of the scale 1c, such graduations indicating different sizes of the diaphragm aperture.

The selector 1 is further provided with a cam or trip 2 which closes a normally open control switch 3 in the flash circuit 4 when the index 1b registers with a graduation on the sector 1d, i.e., when the camera is ready for operation with flash. This switch 3 opens automatically when the index 1b is moved in a clockwise direction, as viewed in FIG. 1, and beyond the segment 1d. The circuit 4 further includes a battery 4a or an analogous source of electrical energy.

The selector 1 also comprises a motion transmitting pin 5 which can rock a two-armed shifter lever 7 fulcrumed at 7a and biased by a resilient element in the form of a helical spring 6 which tends to rotate the lever in a counter-clockwise direction as indicated by an arrow a. The left-hand arm of the shifter lever 7 has an elongated slot which accommodates a pin 8 secured to a shifter sleeve 9 which is rotatable on and is movable axially along a vertical shaft 10. This shaft 10 forms part of an indexing mechanism for a multiple flash bulb holder 16 of the type known as "Flashcube." This holder 16 has four vertical sides each located in front of a flash bulb 16a, and each flash bulb 16a is located in front of a reflector 16b. The function of the indexing mechanism is to rotate the holder 16 through exactly 90 degrees in response to successive operations of a drive here shown as a film transporting mechanism 12 so that a fresh flash bulb 16a faces the subject whenever the film is advanced by the length of a frame. The indexing mechanism further comprises a gear 11 which is coaxially secured to the shaft 10 at a level below the shifter sleeve 9 and meshes with a gear 11a on a shaft 11b journalled in an internal bearing bracket 11c of the housing H. The gear 11a receives motion from the film transporting mechanism 12. The indexing mechanism further comprises a first clutch disk 13 which is rotatable relative to but shares axial movements of the shifter sleeve 9 and can move with this sleeve up and down along the shaft 10 when the shifter lever 7 is caused to turn about the pivot 7a. When the index 1b registers with the sector 1d, the pin 5 bears against the right-hand arm of the lever 7 so that the latter is rocked in a clockwise direction and expands the spring 6. The left-hand arm of the lever 7 then maintains the shifter sleeve 9 and clutch disk 13 in an upper end position in which the clutch disk 13 engages with a second clutch disk 14 rotatable in a suitably configurated portion of the housing H. The clutch disk 14 is rotatable in the housing H but cannot move axially and is rigidly secured to a female coupling member or socket 15. The base 16c of the multiple flash bulb holder 16 has a downwardly extending male coupling member or plug 16d which is nonrotatably fitted into a preferably cruciform recess in the top face of the socket 15. The teeth 16e on the plug 16d can be engaged by a suitable retaining spring (not shown), for example, a hairpin spring which expands when the plug is pushed into the recess of the socket and then contracts above the teeth 16e to retain the plug with a force sufficient to prevent uncontrolled ejection of the holder 16.

The clutch disks 13, 14 together constitute a very simple claw clutch which can be disengaged by the simple expedient of shifting the lower clutch disk 13 downwardly so that its upwardly facing claws (not shown) are disengaged from the downwardly facing claws of the clutch disk 14. Such downward movement of the clutch disk 13 will take place in automatic response to contraction of the spring 6, i.e., in response to movement of the pin 5 away from the right-hand arm of the shifter lever 7 when the selector 1 moves its index 1b away from registry with the sector 1d.

The camera housing H accomodates a pair of fixed contacts 17 which can be engaged by successive pairs of contacts 18 provided on the base 16c of the multiple flash bulb holder 16. One pair of contacts 18 is provided for each flash bulb 16a, and the contacts 17 are engaged by a pair of contacts 18 when the corresponding flash bulb 16a faces the subject. The contacts 17 and 18 form part of the aforementioned flash circuit 4, and this circuit can be completed only when the control switch 3 is closed by the trip 2 as well as when the fixed contacts 17 are engaged by a pair of contacts 18. The flash circuit 4 further comprises a conventional synchronizing switch (not shown) which can be closed by the release trigger when the camera is ready to make an exposure with flash. The arrow b indicates the direction in which the clutch disk 13 is shifted with the sleeve 9 when the pin 5 of the selector 1 rocks the lever 7 in the direction indicated by the arrow a.

The film transporting mechanism 12 comprises a rotary motion transmitting gear 19 which is rotated by a suitable wheel or lever (not shown) whenever the operator wishes to advance the film by the length of a frame. The gear 19 is then rotated through exactly 90 degrees, and this gear comprises two axially parallel motion transmitting projections here shown as pins 20a, 20b which extend into a recess 21 provided in a locking member 22. The locking member 22 is permanently biased by a helical spring 23a which tends to shift it in the direction indicated by an arrow c. This locking member 22 is reciprocable in suitable ways provided therefor in the interior of the housing H. When the user has completed an exposure with flash, the left-hand end portion 22a of the locking member 22 extends into the path of a projection or tooth 23 provided on the selector 1 so that the latter cannot move its index 1b away from registry with the sector 1d. In other words, the locking member 22 automatically prevents the user from making an exposure unless and until the film is actually advanced to place an unexposed film frame into registry with the objective. The user rapidly learns that he must operate the film transporting mechanism 12 whereby such operation of the mechanism 12 automatically results in disengagement of the locking member 22 from the projection 23 in the following way:

When the mechanism 12 is operated by the user, the gear 19 rotates in the direction indicated by the arrow d, see FIG. 2. The pin 20a then engages a surface 21a which bounds the front end of the recess 21 and moves the locking member 22 in a direction to the left, as viewed in the drawings, so that the spring 23a expands and the end portion 22a of the locking member 22 moves to its inoperative position by moving away from the pathway of the projection 23 on the selector ring 1.

A retaining element, here shown as a leaf spring 24, enters a suitable recess or notch 25 in the locking member 22 when the latter does not obstruct rotation of the selector ring 1 so that the locking member then remains in its inoperative position. The operator is now free to set the camera for operation with automatic selection of exposure values (graduation A) or for operation with manual determination of the exposure time (when the index 1b registers with the graduation B).

As stated before, proper transport of the film by the length of a frame necessitates rotation of the gear 19 through 90 degrees (arrow d). However, and as can be seen by observing FIG. 2, the locking member 22 is moved to its inoperative position (so that the retaining spring 24 enters the notch 25) when the gear 19 is turned through a fraction of 90°, namely, through 45°. This means that, upon completed rotation of the gear 19 through full 90°, the pins 20a, 20b cannot interfere with return movement of the locking member 22 under the action of the spring 23a. In other words, when the gear 19 is idle, it does not cause the pins 20a, 20b to interfere with return movement of the end portion 22a into the pathway of the projection 23 on the selector ring 1.

FIG. 2 shows that the locking member 22 is provided with a further recess or notch 26 which can receive a stud or projection 27 provided on a depressible release trigger 28. The notch 26 registers with the stud 27 only when the notch 25 receives the spring 24, i.e., when the film transporting mechanism 12 has been operated to place an unexposed film frame into requisite position for making an exposure. This is a safety measure which prevents actuation of the release trigger 28 unless the diaphragm and the shutter of the camera will admit light to an unexposed film frame. When the spring 24 has entered the notch 25, the trigger 28 can be depressed to its shutter-releasing position by moving in the direction indicated by the arrow e but can follow the bias of its return spring 29 only when the locking member 22 has been returned to inoperative position. A stop plate 30 on the locking member 22 prevents upward movement of the stud 27 (i.e., return movement of the trigger 28 to starting position under the action of the spring 29) when the stud 27 does not register with the notch 26.

A detent device is provided to prevent uncontrolled rotation of the socket 15 when the clutch disk 13 is disengaged from the clutch disk 14. This detent device comprises a ball 31a which is biased by a spring 31 and is received in one of four equidistant notches 15a in the peripheral surface of the socket 15 whenever one of the flash bulbs 16a faces the subject. It is clear that the detent device may be arranged to cooperate with the clutch disk 14, with the clutch disk 13 or with the shifter sleeve 9 and/or shaft 10. All that counts is to install the detent device in such a way that the holder 16 is retained in a given angular position unless and until the socket 15 receives motion from the claw clutch 13, 14.

It is further clear that the camera of our invention may be provided with a suitable ejector which will automatically eject a spent holder 16 as soon as all of its flash bulbs 16a are used up. Alternatively, the ejector may be of the manually operable type. The ejector is not shown because it forms no part of the present invention.

A very important advantage of the trip 2 is that the circuit of a flash bulb 16a can be completed only when the selector 1 has actually adjusted the camera for operation with flash. The claw clutch including the disks 13, 14 insures that the indexing mechanism will rotate the socket 15 and holder 16 only when the camera has completed an exposure with flash so that a fresh flash bulb 16a must be placed in an optimum position with reference to the subject. In such optimum position of a flash bulb 16a, the axis of the respective reflector 16b is preferably parallel or substantially parallel with the optical axis of the objective. The clutch 13, 14 is inoperative when the film transporting mechanism 12 is operated subsequent to an exposure with daylight. In other words, a fresh flash bulb 16a is always ready for use as long as the holder 16 contains at least one fresh bulb.

The locking member 22 insures that the holder 16 is invariably caused to change its angular position and to place a fresh bulb 16a into requisite position in automatic response to completion of an exposure with flash. This is due to the aforementioned feature that the selector 1 cannot be rotated to set the camera for operation without flash unless the user has operated the film transporting mechanism 12. The locking member 22 also prevents return movement of the trigger 28 to starting position prior to manipulation of the film transporting mechanism 12.

The film transporting mechanism 12 further comprises a ratchet wheel 32 which is connected with the shaft for the gear 19 and cooperates with a pawl 33 which prevents rotation of the ratchet wheel 32 in a clockwise direction, as viewed in FIG. 2. The sprocket 34 of the film transporting mechanism is coupled with the gear 19 in a manner not shown in the drawings, and its teeth enter successive perforations in one longitudinal edge portion of the film.

The numeral 35 denotes a resilient displacing element which is carried by the trigger 28 and serves to expel the pallet of the leaf spring 24 from the notch 25 when the trigger is depressed to shutter-releasing position. FIG. 1 shows the trigger in fully depressed position in which the displacing element 35 has moved the leaf spring 24 away from engagement with the locking lever 22. The latter then follows the bias of the spring 23a and moves its end portion 22a to operative position, namely, into the pathway of the tooth 23 on the selector 1 so that the latter cannot be rotated for the purpose of setting the camera for making exposures in daylight excepting subsequent to operation of the film transporting mechanism 12. The end portion 22a cannot interfere with rotation of the selector 1 to move the index 1b from registry with the graduation A into registry with the graduation B, or vice versa.

It is further to be noted that, though the drive which withdraws the locking member 22 from the path of the selector 1 is shown as being constituted by the film transporting mechanism 12, such drive may constitute the cocking mechanism for the shutter of the camera or the mechanism 12 can also serve as a means for cocking the shutter. In other words, we prefer to move the locking member 22 to inoperative position by a drive which, in addition to such unblocking, also performs another important function which is necessary for normal manipulation of the camera.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles, said indexing means comprising a rotary coupling member mounted in said support and separably connected with said holder; drive means for operating said indexing means, said indexing means further comprising a clutch including a first clutch element connected with said coupling member, a second clutch element normally engaging said first clutch element and arranged to receive motion from said drive means, and a rotary shaft axially movably supporting said second clutch element and arranged to rotate therewith; manually operated selector means provided on said support and movable between at least one first position in which said control switch means is open to prevent completion of said flash circuit so that the camera is set for operation in daylight, and at least one second position in which said control switch means is closed and the camera is set for operation with flash; means for preventing rotation of said coupling member by said drive means in response to movement of said selector means to first position, said rotation preventing means comprising shifter means for disengaging said clutch elements in response to movement of said selector means to first position and said shifter means comprising a sleeve rotatable with reference to said second clutch element and movable therewith axially of said shaft, a lever rockably mounted in said support, a pin-and-slot connection coupling said lever with said sleeve to move said second clutch element into and away from engagement with said first clutch element in response to rocking of said lever in opposite directions, resilient means for biasing said lever in one direction, and motion transmitting means provided on said selector means for rocking said lever in the other direction in response to movement of said selector means between said first and second positions.

2. A structure as set forth in claim 1, wherein said resilient means is arranged to bias said lever in a direction to disengage said second clutch element from said first clutch element.

3. A structure as set forth in claim 2, wherein said motion transmitting means comprises a pin fixed to said selector means and wherein said lever comprises an arm which is rocked by said pin to move said second clutch element into engagement with said first clutch element when said selector means is moved from said first to said second position.

4. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles; drive means for operating said indexing means, said drive means comprising film transporting means arranged to transport the film by the length of a frame between successive exposures; manually operated selector means provided on said support and movable between at least one first position in which said control switch means is open to prevent completion of said flash circuit so that the camera is set for operation in daylight, and at least one second position in which said control switch means is closed and the camera is set for operation with flash; and locking means movable between an operative position in which said selector means is held against movement between said positions thereof and an inoperative position in which said selector means is free to move between said positions thereof, said drive means further comprising motion transmitting means for moving said locking means to inoperative position in response to completed transport of the film by the length of a frame.

5. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles; drive means for operating said indexing means, said drive means comprising a shutter cocking mechanism arranged to cock the shutter subsequent to completion of an exposure; manually operated selector means provided on said support and movable between at least one first position in which said control switch means is open to prevent completion of said flash circuit so that the camera is set for operation in daylight, and at least one second position in which said control switch means is closed and the camera is set for operaton with flash; and locking means movable between an operative position in which said selector means is held against movement between said positions thereof and an inoperative position in which said selector means is free to move between said positions thereof, said drive means comprising motion transmitting means for moving said locking means to inoperative position in response to completed cocking of the shutter means.

6. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles; drive means for operating said indexing means, said drive means comprising a mechanism having at least one part which is actuated between successive exposures, the operation of said indexing means by said drive means being incidental to actuation of said part; manually operated selector means provided on said support and movable between at least one first positon in which said control switch means is open to prevent completion of said flash circuit so that the camera is set for operation in daylight, and at least one second position in which said control switch means is closed and the camera is set for operation with flash; locking means movable between an operative position in which said selector means is held against movement between said positions thereof and an inoperative position in which said selector means is free to move between said positions thereof, said drive means further comprising motion transmitting means for moving said locking means to inoperative position in response to completed actuation of said part; means for permanently biasing said locking means to operative position; retaining means for holding said locking means in response to movement to inoperative position; and trigger means movable between starting and shutter releasing positions, said trigger means comprising displacing means for disengaging said retaining means from said locking means in response to movement of said trigger means from starting position.

7. A structure as set forth in claim 6, further comprising means for permanently biasing said trigger means to starting position.

8. A structure as set forth in claim 6, wherein said locking means comprises means for blocking movement of said trigger means to starting position when the locking means assumes said operative position.

9. A structure as set forth in claim 6, wherein said locking means comprises a reciprocable locking member and wherein the motion transmitting means of said drive means comprises a rotary member and a projection extending into a recess provided in said locking member to move said locking member to inoperative position in response to rotation of said rotary member.

10. A structure as set forth in claim 9, wherein said rotary member is movable through an angle of given magnitude in response to each operation of said drive means and wherein said projection is disengaged from said locking member when said rotary member is rotated through a pretedermined fraction of said given angle.

11. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles; drive means for operating said indexing means; manually operated selector means provided on said support and movable between at least one first position in which said control switch means is open to prevent completion of said flash circuit so that the camera is set for operation in daylight, and at least one second position in which said control switch means is closed and the camera is set for operation with flash, said selector means comprising a ring which is rotatable between said first and second positions; means for preventing rotation of said holder by said drive means in response to movement of said ring to second poisition; and locking means for holding said ring against movement from said second to said first position prior to operation of said drive means.

12. A structure as set forth in claim 11, wherein said drive means comprises a film transporting mechanism and said locking means is coupled to a rotary element of said mechanism to release said ring in response to movement of the film by the length of a frame.

13. In a photographic camera, a support; a flash unit comprising a holder rotatable with reference to said support and having a plurality of flash bulbs, and a flash circuit including control switch means, said flash bulbs being connected in said flash circuit one after the other in response to successive angular displacements of said holder through angles of predetermined magnitude; indexing means for moving said holder through such angles; drive means for operating said indexing means, said drive means comprising a mechanism having at least one part which is actuated between successive exposures and the operation of said indexing means by said drive means being incidental to actuation of said part; manually operated selector means provided on said support and movable between at least one first position in which said control switch means is open to prevent completion of said flash circuit so that the camera is set for operation in daylight, and at least one second position in which said control switch means is closed and the camera is set for operation with flash; and locking means movable between an operative position in which said selector means is held against movement between said positions thereof and an inoperative position in which said selector means is free to move between said positions thereof, said drive means further comprising motion transmitting means for moving said locking means to inoperative position in response to completed actuation of said part.

References Cited

UNITED STATES PATENTS

| 3,260,181 | 7/1966 | Hennig et al. | 95—11 |
| 3,273,479 | 9/1966 | Jakob | 95—11 |
| 3,296,947 | 1/1967 | Engelsmann et al. | 95—1 |
| 3,334,562 | 8/1967 | Schroder et al. | 95—31 |
| 3,353,468 | 11/1967 | Beach | 95—11.5 |
| 3,374,720 | 3/1968 | Harvey | 95—11.5 |

NORTON ANSHER, Primary Examiner

FRED L. BRAUN, Assistant Examiner

U.S. Cl. X.R.

95—31; 240—1.3, 37.1